US007817165B1

(12) United States Patent
Donham et al.

(10) Patent No.: US 7,817,165 B1
(45) Date of Patent: Oct. 19, 2010

(54) SELECTING REAL SAMPLE LOCATIONS FOR OWNERSHIP OF VIRTUAL SAMPLE LOCATIONS IN A COMPUTER GRAPHICS SYSTEM

(75) Inventors: Christopher D. S. Donham, San Mateo, CA (US); Edward A. Hutchins, Mountain View, CA (US); Gary C. King, San Jose, CA (US); Michael J. M. Toksvig, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 503 days.

(21) Appl. No.: 11/643,185

(22) Filed: Dec. 20, 2006

(51) Int. Cl.
*G09G 5/00* (2006.01)
(52) U.S. Cl. .................. 345/619; 345/611; 345/612; 345/613; 345/614
(58) Field of Classification Search ............. 345/619, 345/611–614
See application file for complete search history.

(56) References Cited

U.S. PATENT DOCUMENTS

| | | | |
|---|---|---|---|
| 5,818,456 A | 10/1998 | Cosman et al. | |
| 6,407,736 B1 * | 6/2002 | Regan | 345/422 |
| 6,452,595 B1 | 9/2002 | Montrym et al. | |
| 6,469,707 B1 | 10/2002 | Voorhies | |
| 6,664,955 B1 * | 12/2003 | Deering | 345/418 |
| 6,720,975 B1 | 4/2004 | Dietrich, Jr. | |
| 6,831,658 B2 * | 12/2004 | Taneja et al. | 345/613 |
| 6,943,791 B2 * | 9/2005 | Pascual et al. | 345/421 |
| 6,947,057 B2 * | 9/2005 | Nelson et al. | 345/611 |
| 6,982,723 B1 | 1/2006 | Szymaniak | |
| 6,999,076 B2 * | 2/2006 | Morein | 345/422 |
| 6,999,100 B1 | 2/2006 | Leather et al. | |
| 7,030,878 B2 * | 4/2006 | Xu et al. | 345/422 |
| 7,129,941 B2 * | 10/2006 | Deering et al. | 345/422 |
| 7,333,119 B1 | 2/2008 | King et al. | |
| 7,372,471 B1 | 5/2008 | Hutchins | |
| 2002/0015041 A1 * | 2/2002 | Naegle et al. | 345/501 |
| 2004/0012610 A1 * | 1/2004 | Taneja et al. | 345/611 |
| 2004/0161146 A1 | 8/2004 | Van Hook et al. | |
| 2004/0174376 A1 | 9/2004 | Deering | |
| 2004/0183801 A1 | 9/2004 | Deering | |
| 2004/0207622 A1 | 10/2004 | Deering et al. | |
| 2006/0077209 A1 | 4/2006 | Bastos et al. | |
| 2006/0103663 A1 | 5/2006 | Collodi | |
| 2006/0170703 A1 | 8/2006 | Liao | |
| 2007/0002068 A1 | 1/2007 | Whitted et al. | |
| 2007/0008336 A1 | 1/2007 | Bastos et al. | |
| 2007/0097145 A1 | 5/2007 | Akenine-Moller | |

OTHER PUBLICATIONS

Kilgariff et al., "The GeForce 6 Series GPU Architecture", Excerpted from GPU Gems 2, 2005 by nVidia Corporation, Chapter 30.

* cited by examiner

*Primary Examiner*—M Good Johnson (57) ABSTRACT

A computer-implemented graphics system has a mode of operation in which primitive coverage information is generated for real sample locations and virtual sample locations for use in anti-aliasing. An individual pixel includes a single real sample location and at least one virtual sample location. A block of real sample locations can be selected to delineate and encompass a region containing a number of virtual sample locations. Pixel attribute values (e.g., z-depth or stencil values) associated with the block of selected real sample locations can be used to associate each virtual sample location within the region with one of the selected real sample locations. The virtual sample location assumes the pixel attribute value of the real sample location with which it is associated.

14 Claims, 9 Drawing Sheets

SELECTING REAL SAMPLE LOCATIONS FOR OWNERSHIP OF VIRTUAL SAMPLE LOCATIONS IN A COMPUTER GRAPHICS SYSTEM

RELATED UNITED STATES PATENT APPLICATIONS

This Application is related to U.S. patent application Ser. No. 11/171,816 by E. Hutchins, filed Jun. 29, 2005, and entitled "System and Method for Single-Sample Virtual Coverage Anti-Aliasing,", assigned to the assignee of the present invention, and hereby incorporated by reference in its entirety.

This is related to U.S. patent application Ser. No. 11/643,545 by E. Hutchins et al., filed concurrently herewith and entitled "Writing Coverage Information to a Framebuffer in a Computer Graphics System,", assigned to the assignee of the present invention, and hereby incorporated by reference in its entirety.

This Application is related to U.S. patent application Ser. No. 11/643,558 by C. Donham et al., filed concurrently herewith and entitled "A Shader that Conditionally Updates a Framebuffer in a Computer Graphics System,", assigned to the assignee of the present invention, and hereby incorporated by reference in its entirety.

FIELD OF THE INVENTION

Embodiments of the present invention generally relate to data processing. More specifically, embodiments of the present invention relate to computer graphics systems and graphics applications.

BACKGROUND ART

Computer graphics systems represent graphical primitives as pixel elements of a display. Aliasing refers to the visual artifacts, such as stair-stepping of surface edges (sometimes known as "jaggies"), that occur when an image is sampled at a spatial sample frequency that is too low.

A variety of anti-aliasing techniques exist to reduce visual artifacts. One example is supersampling, in which an image is sampled more than once per pixel grid cell and the samples are filtered. For example, in supersampling, the contribution of each sample in a pixel may be weighted to determine attributes of the pixel, such as the pixel color. Another example of an anti-aliasing technique is multisampling. As objects are rendered in a multisampling system, a single color is typically computed per primitive and used for all subpixel samples covered by the primitive.

In both supersampling and multisampling, the quality of the anti-aliasing tends to improve as the number of samples per partially covered pixel increases. For example, increasing the number of samples per pixel from four samples ("4×" sampling) to sixteen samples ("16×" sampling) would be expected to reduce visual artifacts. However, as the number of samples per pixel increases, more sample data must be generated, stored, transported and processed. Consequently, more computing resources, such as memory and bandwidth, may be needed as the number of samples per pixel is increased. As a result, the cost and complexity of graphics systems tend to increase as the number of samples used for anti-aliasing increases.

SUMMARY OF THE INVENTION

Accordingly, an effective but computationally efficient anti-aliasing system or method would be advantageous. Embodiments in accordance with the present invention provide these and other advantages.

In one embodiment, a computer-implemented graphics system has a mode of operation—referred to as virtual coverage anti-aliasing (VCAA) or coverage sampling anti-aliasing (CSAA)—in which coverage information is generated for real sample locations and virtual sample locations for use in anti-aliasing. In one such embodiment, an individual pixel includes a single real sample location and at least one virtual sample location. An array of real sample locations can be selected to delineate and encompass a region containing a number of virtual sample locations. Pixel attribute values (e.g., z-depth or stencil values) associated with the array of selected real sample locations can be used to associate each virtual sample location within the region with one of the selected real sample locations. The virtual sample location assumes the pixel attribute value of the real sample location with which it is associated.

In one embodiment, the graphics system renders a two-by-two region of a screen, referred to as a quad. With CSAA enabled, rendering is shifted so that a three-by-three array of real samples, and an associated region containing 16 virtual samples, is rendered. All of the virtual samples in the region are associated with one of the real samples in the selected array. As a result, the number of real sample values (e.g., pixel attribute values) needed for tests such as depth tests and stencil tests is reduced. In one embodiment, to process 16 virtual samples, only 9 real samples are used instead of 12 real samples. Accordingly, computer resources (e.g., the bandwidth associated with reads from the framebuffer) are conserved.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "selecting," "performing," "using," "associating," "making," "identifying," "determining," "specifying," "receiving," "producing," "writing," "changing," "maintaining, "updating" or the like, refer to actions and processes (e.g., flowcharts 600, 800 and 900 of FIGS. 6, 8 and 9, respectively) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Figure 1:
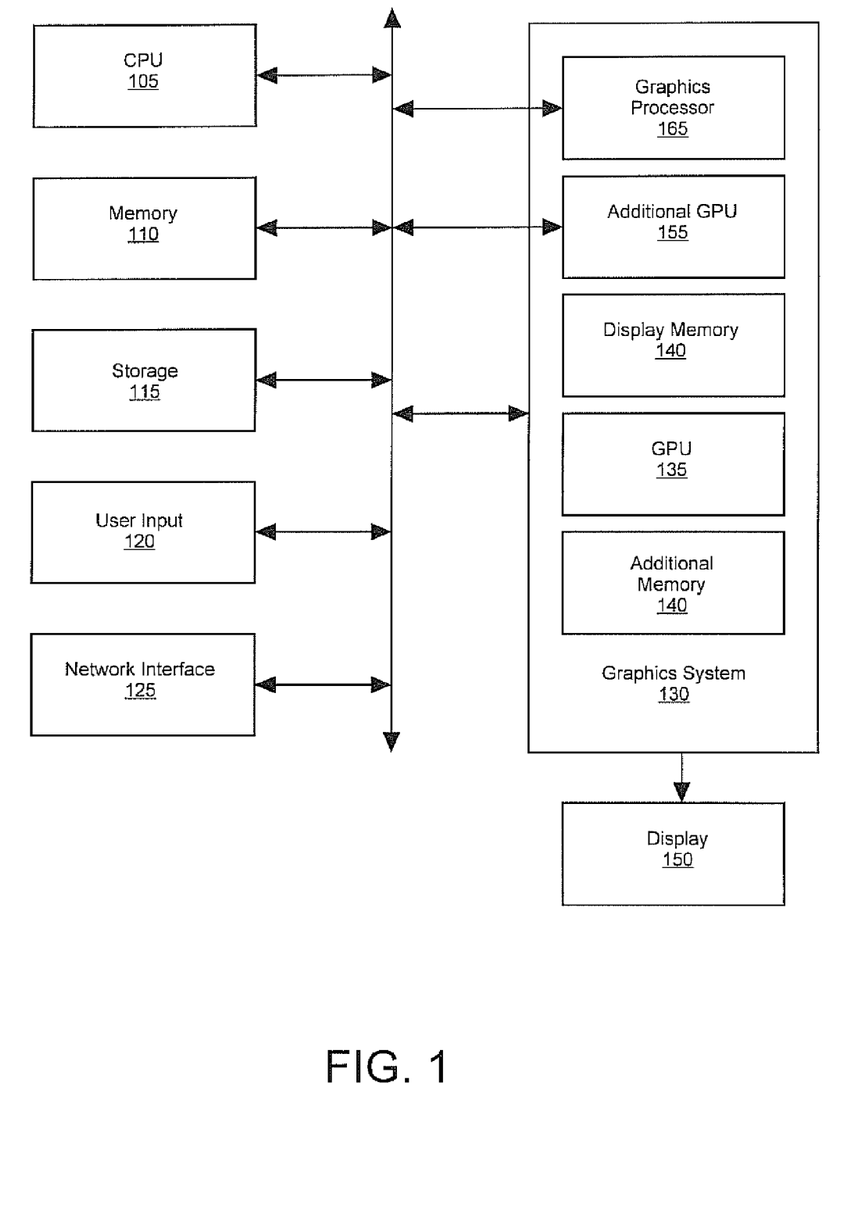
FIG. 1 is a block diagram of an exemplary computer system upon which embodiments in accordance with the present invention can be implemented.

FIG. 1 is a block diagram of an example of a computer system 100, such as a personal computer (desktop, laptop, notebook), video game console, personal digital assistant, cellular phone, computer-based simulator, digital camera, or other digital device, on which embodiments of the present invention can be implemented.

In the example of FIG. 1, computer system 100 includes a central processing unit (CPU) 105 for running software applications and optionally an operating system. Memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. User input 120 includes devices that communicate user inputs from one or more users to the computer system 100 and may include keyboards, mice, joysticks, touch screens, and/or microphones. Network interface 125 allows computer system 100 to communicate with other computer systems via an electronic communications network, including wired and/or wireless communication. The components of computer system 100, including CPU 105, memory 110, data storage 115, user input devices 120, and network interface 125, are connected via one or more data buses 160.

In the present embodiment, graphics system 130 is connected with data bus 160 and the components of the computer system 100. The graphics system 130 may be integrated with the computer system motherboard or on a separate circuit board fixedly or removably connected with the computer system. The graphics system 130 may include a graphics processing unit (GPU) 135 and graphics memory. Graphics memory may include a display memory 140 (e.g., a framebuffer) used for storing pixel data for each pixel of an output image. In another embodiment, display memory 140 and/or additional memory 145 are part of memory 110 and are shared with the CPU 105. Alternatively, display memory 140 and/or additional memory 145 can be one or more separate memories provided for the exclusive use of the graphics system 130.

Pixel data can be provided to display memory 140 directly from the CPU 105. Alternatively, CPU 105 can provide the GPU 135 with data and/or commands defining the desired output images, from which the GPU 135 can generate the pixel data of one or more output images. The data and/or commands defining the desired output images can be stored in additional memory 145. In one embodiment, the GPU 135 can generate pixel data for output images from rendering commands and data defining the geometry, lighting, shading, texturing, motion, and/or camera parameters for a scene to be rendered.

The graphics system 130 periodically outputs pixel data for an image from display memory 140 for display on display device 150. Display device 150 is any device capable of displaying visual information in response to a signal from the computer system 100. Computer system 100 can provide the display device 150 with an analog or digital signal.

In another embodiment, graphics processing system 130 includes one or more additional GPUs 155, similar to GPU 135. In yet another embodiment, graphics processing system 130 includes a graphics coprocessor 165. Graphics coprocessor 165 and additional GPU 155 are adapted to operate in parallel with GPU 135 or in place of GPU 135. Additional GPU 155 generates pixel data for output images from rendering commands, similar to GPU 135. Additional GPU 155 can operate in conjunction with GPU 135 to simultaneously generate pixel data for different portions of an output image, or to simultaneously generate pixel data for different output images. In one embodiment, graphics coprocessor 165 per-forms rendering related tasks such as geometry transformation, shader computations, and backface culling operations for GPU 135 and/or additional GPUs 155.

Additional GPU 155 can be located on the same circuit board as GPU 135, sharing a connection with GPU 135 to data bus 160, or additional GPU 155 can be located on an additional circuit board separately connected with data bus 160. Additional GPU 155 can also be integrated into the same module or chip package as GPU 135. Additional GPU 155 can have its own display and additional memory, similar to display memory 140 and additional memory 145, or can share memories 140 and 145 with GPU 135. In one embodiment, the graphics coprocessor 165 is integrated with the computer system chipset (not shown), such as the Northbridge or Southbridge chip used to control the data bus 160.

Figure 2:
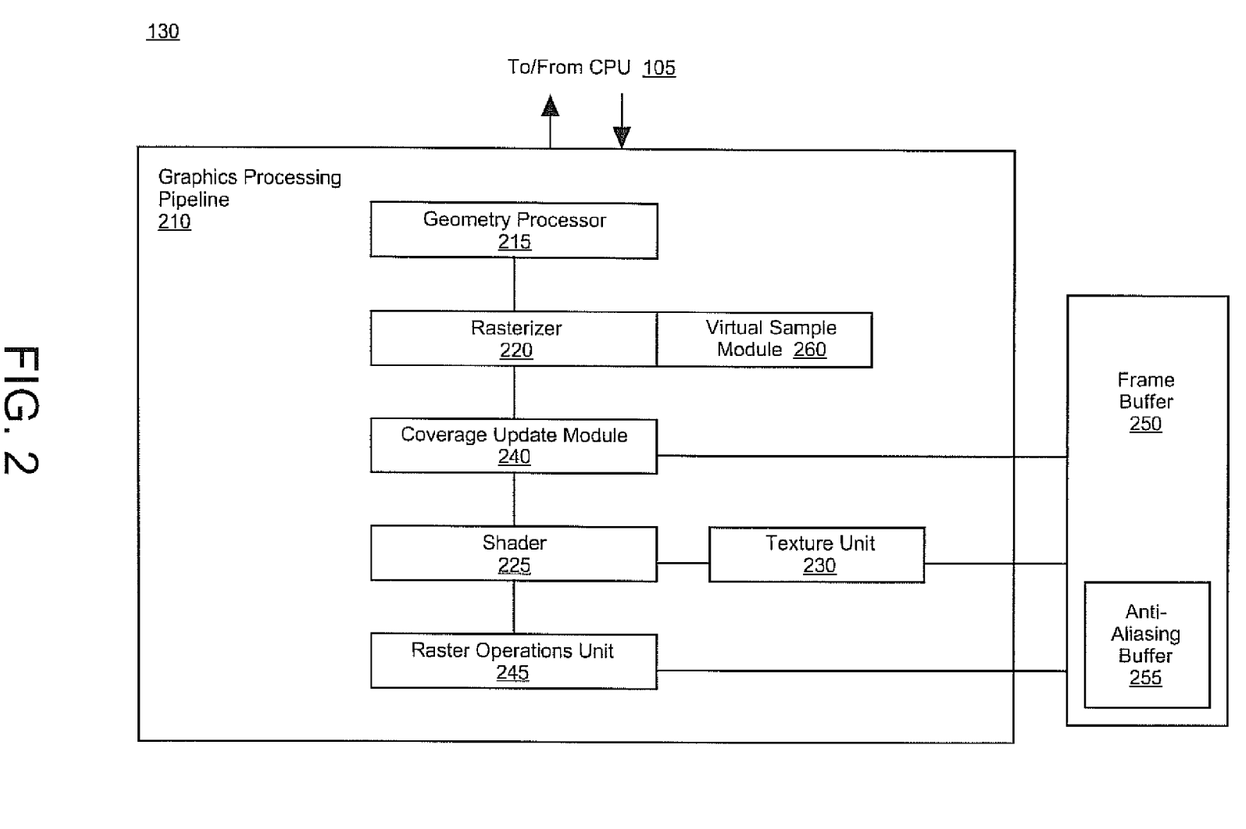
FIG. 2 is a block diagram of an example computer graphics system upon which embodiments in accordance with the present invention can be implemented.

FIG. 2 illustrates a graphics system 130 in accordance with one embodiment of the present invention. A graphics processing pipeline 210 receives commands for generating graphical images from CPU 105. There may be more than one graphics processing pipeline, operating in parallel. Graphics processing pipeline 210 may be disposed on a GPU (e.g., GPU 135 or GPU 155 of FIG. 1) and includes, for example, a geometry processor 215, a rasterizer 220, a shader unit 225 and a texture unit 230, and a raster operations (ROP) unit 245. Framebuffer 250 may include an anti-aliasing (AA) buffer 255, such as a multi-sample (MS) buffer in a multisampling embodiment, for storing real samples.

In general, geometry processor 215 generates primitives from vertex data. In one embodiment, geometry processor 215 receives rendering commands and data used to define the desired rendered image or images, including geometry, lighting, shading, texturing, motion, and/or camera parameters for a scene. The rendering data may include one or more vertices defining geometric primitives. Each vertex has a position that is typically expressed in a two-dimensional or three-dimensional coordinate system. In addition to a position, various attributes are associated with each vertex. In general, attributes of a vertex may include any property that is specified on a per-vertex basis. In one embodiment, the vertex attributes include scalar or vector attributes used to determine qualities such as the color, transparency, lighting, shading, and animation of the vertex and its associated geometric primitives.

In one embodiment, geometry processor 215 executes one or more vertex programs on each vertex to create a transformed vertex. The geometry processor 215 is programmable, and rendering applications can specify the vertex program to be used for any given set of vertices. In one embodiment, the vertex program transforms a vertex from a three-dimensional world coordinate system to a two-dimensional screen coordinate system. More complicated vertex programs can be used to implement a variety of visual effects, including lighting and shading, procedural geometry, and animation operations. In one embodiment, geometry processor 215 also culls or discards geometric primitives and/or portions thereof that are outside the field of view or otherwise unseen in the rendered image, and also may assemble one or more vertices into a geometric primitive, such as a triangle or quadrilateral.

In general, rasterizer 220 rasterizes primitives. In one embodiment, rasterizer 220 converts each geometric primitive into one or more pixel fragments. A pixel fragment defines a set of one or more pixels to be potentially displayed in the rendered image. In one implementation, a fragment comprises a two-pixel-by-two-pixel (2×2) array, referred to herein as a quad. In alternate implementations, fragments can include any other arrangement of fragments and pixels. Each fragment coming out of the rasterizer includes information defining the potential coverage of the associated geometric primitive in the rendered image, for example image coordinates of the pixels associated with the fragment and coverage of the associated geometric primitive at that pixel location.

In one embodiment, shader 225 uses the position information generated by rasterizer 220 and associated with each pixel fragment, as well as per-vertex and per-geometric primitive attributes, to determine the output values (for example, color and depth) of each fragment. A shader program is executed on each pixel fragment to determine an output color value for a pixel. In the present embodiment, texture unit 230 fetches a texture (specifically, a texel), and maps the texture to a pixel location in an image.

The shaded fragments are then output to the raster operations unit 245, along with attributes such as fragment color, depth, and stencil values. The raster operations unit 245 integrates the fragments that are output from the shader 225 with the portion of the rendered image already stored in the framebuffer 250. Fragments can be blended or masked with pixels previously written to the rendered image in the framebuffer 250. Raster operations can also include anti-aliasing and discarding of occluded primitives. The combination of each incoming fragment and any previously stored pixel values in the framebuffer 250 is then output to the framebuffer as part of the rendered image.

Framebuffer 250 may include an anti-aliasing (AA) buffer 255, such as a multi-sample (MS) buffer in a multisampling embodiment, for storing real samples. Depth buffers, alpha buffers, and stencil buffers can also be used to determine the contribution of each incoming fragment, if any, to the rendered image.

Figure 3A:
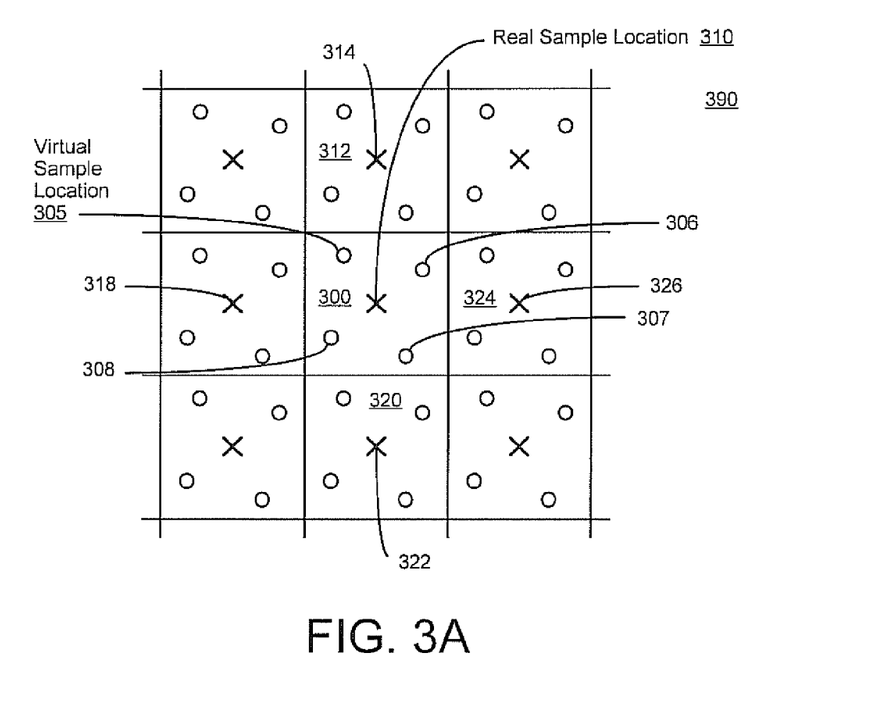
FIG. 3A illustrates pixels that include real and virtual sample locations according to an embodiment of the present invention.

In a coverage sampling anti-aliasing (CSAA) embodiment, graphics system 130 includes a virtual sample module 260 to calculate the fractional coverage of pixels comprising a primitive (FIG. 3A). CSAA may also be referred to as virtual coverage anti-aliasing; for simplicity of discussion, CSAA is used herein. In one such embodiment, virtual sample module 260 generates the primitive coverage at the virtual sample locations. The virtual samples that are generated may be stored in one or more locations, such as in a framebuffer, color buffer, z-buffer, or another memory location. In one embodiment, the coverage update unit 240 reads the current coverage from the frame buffer, updates the coverage based on the coverage of the real and virtual samples, and writes the resulting coverage to the frame buffer 250. Although coverage update module 240 and virtual sample module 260 are illustrated at a particular location within graphics pipeline 210, they may be located elsewhere, such as in ROP 245.

Virtual sample module 260 and coverage update module 240 of FIG. 2 may, in some embodiments, be configured to generate and utilize virtual samples in anti-aliasing calculations for specific operational conditions. In some embodiments, virtual samples are utilized for anti-aliasing calculations only for edge pixels (e.g., only for partially covered pixels). In some embodiments, coverage updates used to generate virtual samples are disabled if a z-depth test operation is disabled, a z-depth write operation is disabled, or alpha blending is enabled. In some embodiments, an application programming interface (API) provides commands for enabling, disabling, and configuring the use of virtual samples to update coverage information during execution of a graphics program by the CPU 105. In one embodiment, heuristics are used to determine when coverage should be updated using virtual samples. For example, the heuristics may be chosen so that rendering modes that correspond to scene geometry get high-quality coverage information using virtual samples, but rendering that corresponds to special effects or lighting (e.g., particles or multi-pass geometry) do not.

FIG. 3A illustrates an array 390 of pixels that include real and virtual sample locations according to an embodiment of the present invention. In the present embodiment, using pixel 300 as an example, each pixel includes a single real sample location 310 and four virtual sample locations 305, 306, 307 and 308 (305-308). Other numbers of virtual sample locations may be utilized, such as two (2) or eight (8) virtual sample locations.

In the present embodiment, the real sample location 310 is in the center of the pixel 300, and the virtual sample locations 305-308 are distributed through the interior of the pixel. In one embodiment, the virtual sample locations are arranged along the edges of the pixel, but not necessarily at a point that corresponds to the midpoint of the edges of pixel 300. In the example of FIG. 3A, virtual sample location 305 is located to the left of the midpoint of its corresponding edge, virtual sample location 306 is above the midpoint of its corresponding edge, virtual sample location 307 is to the right of the midpoint of its corresponding edge, and virtual sample location 308 is below the midpoint of its corresponding edge.

In the example of FIG. 3A, virtual sample location 305 can be associated with (mapped to, or "owned" by) either real sample location 310 or real sample location 314 in pixel 312; virtual sample location 306 can be associated with either real sample location 310 or real sample location 326 in pixel 324; virtual sample location 307 can be associated with either real sample location 310 or real sample location 322 in pixel 320; and virtual sample location 308 can be associated with either real sample location 310 or real sample location 318 in pixel 316. In general, the virtual sample locations on the left and right sides of a pixel are associated with a real sample location in the center of the pixel or the real sample location to the left or right of the virtual sample location, and the virtual sample locations on the top and bottom of a pixel are associated with a real sample location in the center of the pixel or the real sample location above or below the virtual sample location.

A real sample location assumes the attributes (e.g., color component value, z-depth value) computed for the position of the real sample within the primitive, and a virtual sample location assumes an attribute or attributes of the real sample location with which it is associated. Thus, although a virtual sample location may reside within one pixel (the local pixel), it may have the attributes of another pixel (specifically, an adjacent pixel). The attribute values at a real sample location are referred to as a real sample, and the attribute values at a virtual sample location are referred to as a virtual sample.

According to embodiments of the present invention, a new primitive that crosses one or more real or virtual sample locations changes the status of virtual samples in the anti-aliasing buffer. Any virtual sample location that is covered by the primitive is updated. Additionally, the status of virtual samples that are uncovered, but are associated with a real sample that is covered, is also updated. Additional details are provided below in conjunction with FIGS. 3B and 4.

Figure 3B:
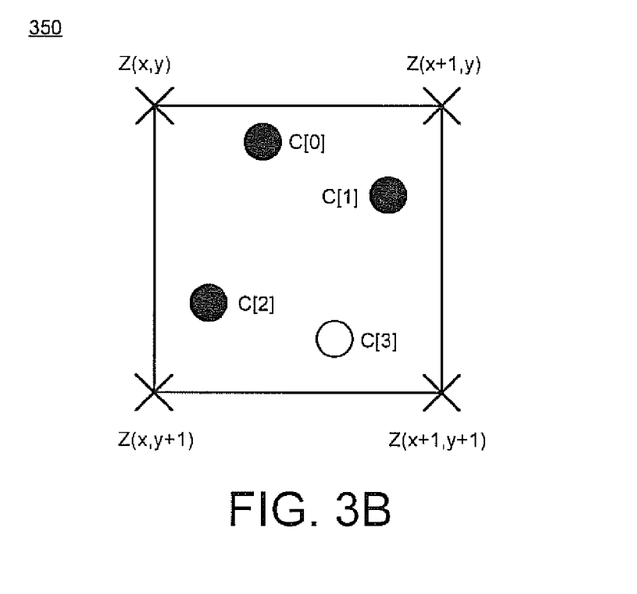
FIG. 3B illustrates a pixel that includes virtual sample locations according to an embodiment of the present invention.

FIG. 3B illustrates a pixel 350 that includes four (4) virtual sample locations according to an embodiment of the present invention. Coverage for the real and virtual samples is evaluated at the real and virtual sample locations. In one embodiment, a virtual sample is implemented using a pointer that maps a correspondence of a virtual sample location within a pixel to a real sample. In one such embodiment, virtual coverage is indicated using a single bit, with a value of one (1) indicating "covered" (that is, the virtual sample location is associated with the local pixel in which it located) and a value of zero (0) indicating "uncovered" (that is, the virtual sample location is associated with an adjacent pixel). In the example of FIG. 3B, there are 4 virtual samples associated with each real sample/pixel, so there are 4 virtual coverage bits for each real sample/pixel. The computed real sample coverage for pixel (x, y) can be referred to as $C_{real}(x,y)$. The virtual sample coverage can be referred to as $C_{virtual}[n](x,y)$ where n is the virtual sample index ranging from 0 to 3 in FIG. 3B. A real or virtual sample is covered if it is inside a given primitive.

The depth of a real sample is used as a surrogate for the virtual sample depth. Although for many primitives the depth value will not be constant across the primitive, use of the real sample depth value still provides a reasonable approximation of the virtual sample depth value. The computed depth for the real sample can be referred to as $Z_{comp}(x,y)$. The computed depth for the real sample is determined using the following relationship:

$$Z_{comp}(x,y)=alpha(x,y)*DZ0+beta(x,y)*DZ1+Z2;$$

where alpha(x,y) and beta(x,y) are the barycentric coordinates for (x,y), $DZ0=(Z0-Z2)$ and $DZ1=(Z1-Z2)$, where Z0, Z1 and Z2 are the z-depth values at the vertices of a triangle primitive.

According to embodiments of the present invention, depth and coverage values for the pixel to the right and for the pixel below the pixel being rendered are fetched; refer to FIG. 5, below. The depth value fetched from the framebuffer can be referred to as $Z_{fb}(x,y)$. The depth value for the pixel to the right can be referred to as $Z_{fb}(x+1,y)$, and the depth value for the pixel below can be referred to as $Z_{fb}(x,y+1)$.

Only the coverage data for the virtual samples may be stored in the framebuffer. So $C_{fb}[n](x,y)$ always refers to virtual coverage data (from the framebuffer) where n is the virtual sample index ranging from 0 to 3 in FIG. 3B.

Continuing with reference to FIG. 3B, in one embodiment, the virtual coverage data from the framebuffer $C_{fb}[n](x,y)$ indicates which depth value to use for a particular sample. The depth value from the frame buffer to use for a particular virtual sample is called $Z_{fb}[n]$ where n is the virtual sample index ranging from 0 to 3 in FIG. 3B. If the coverage value for a virtual sample is 0, the depth value from the adjacent pixel is used for the virtual depth. If the coverage value for a virtual sample is 1, the depth value from the local pixel is used for the virtual depth. With reference to FIG. 3B, $C_{fb}[0](x,y)=1$ selects $Z_{fb}[0]=Z_{fb}(x,y)$;

$C_{fb}[0](x,y)=0$ selects $Z_{fb}[0]=Z_{fb}(x+1,y)$;

$C_{fb}[1](x,y)=1$ selects $Z_{fb}[1]=Z_{fb}(x+1,y)$;

$C_{fb}[1](x,y)=0$ selects $Z_{fb}[1]=Z_{fb}(x+1,y+1)$;

$C_{fb}[2](x,y)=1$ selects $Z_{fb}[2]=Z_{fb}(x,y+1)$;

$C_{fb}[2](x,y)=0$ selects $Z_{fb}[2]=Z_{fb}(x,y)$;

$C_{fb}[3](x,y)=1$ selects $Z_{fb}[3]=Z_{fb}(x+1,y+1)$;

$C_{fb}[3](x,y)=0$ selects $Z_{fb}[3]=Z_{fb}(x,y+1)$.

The primitive coverage can then be updated based on the results of a depth test. Using the depth value chosen to represent the framebuffer for each virtual sample, as well as the depth value for the real sample from the framebuffer, the depth test is performed against the computed depth for the pixel. For each sample that fails the depth test, the coverage value is now considered to be 0:

$$C_{virtual}[i](x,y)=C_{virtual}[i](x,y)\&ZTest(Z_{fb}[i],Z_{comp}).$$

Similarly, the depth test can be applied to the real sample for each pixel:

$$C_{real}(x,y)=C_{real}(x,y)\&ZTest(Z_{fb}(x,y),Z_{comp}).$$

New coverage data can then be merged with the old coverage data. If the real sample is covered ($C_{real}(x,y)=1$), then the merged coverage values are the primitive virtual coverage values ($C_{virtual}[i](x,y)$) for all samples in the pixel: $C_{merged}[i](x,y)=C_{virtual}[i](x,y)$. If the real sample is not covered ($C_{real}(x,y)=0$), then only the virtual sample data for covered samples ($C_{virtual}[i](x,y)=1$) is updated. For any covered sample, the merged coverage is 0. For any uncovered sample, the merged coverage is the original framebuffer coverage: $C_{merged}[i](x,y)=C_{virtual}[i](x,y)$ ? $0:C_{fb}[i](x,y)$. Note that the real sample used to determine how to merge the coverage ($C_{real}(x,y)$) is the one associated with each subsample (for C[0] it's the one at (x, y), for C[1] it's the one at (x+1,y), for C[2] it's the one at (x, y+1) and for C[3] it's the one at (x+1, y+1)).

The merging of the framebuffer coverage ($C_{fb}[n](x,y)$) and the primitive coverage ($C_{virtual}[n](x,y)$) depends on the operating mode. In a non-transparency mode, all coverage data is updated as described above. In a transparency mode, only pixels which have partial coverage are updated (e.g., fully covered pixels are not updated) as described above. The framebuffer is then updated as needed.

Figure 4:
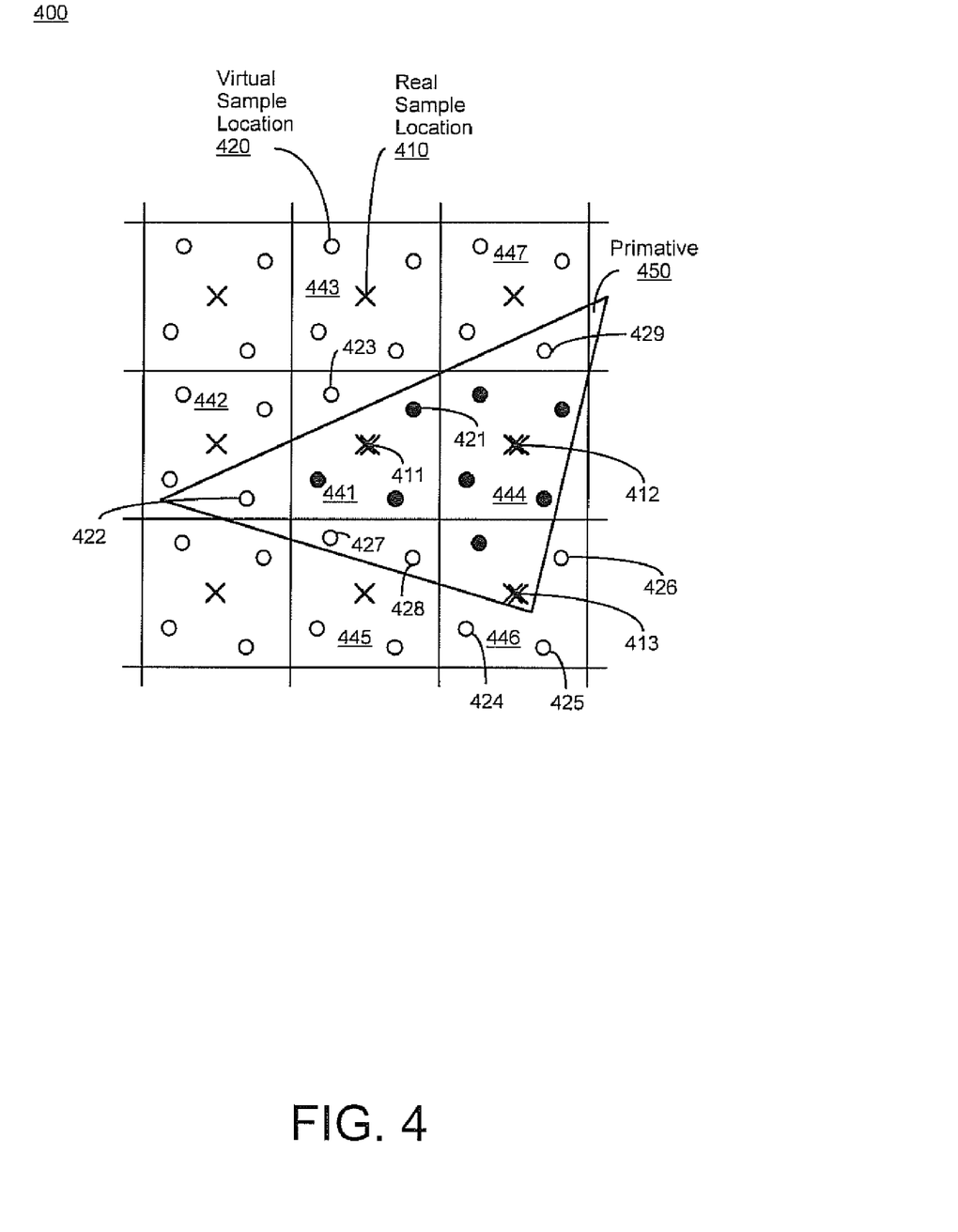
FIG. 4 illustrates a primitive and a block of pixels according to an embodiment of the present invention.

FIG. 4 illustrates a block 400 of pixels that is partially covered by a primitive 450 according to an embodiment of the present invention. In the example of FIG. 4, each pixel has one real sample location (e.g., real sample location 410). In FIG. 4, a single cross symbol (X) is used to identify a real sample location that is not covered by the primitive, and a double-cross symbol is used to identify a real sample location that is covered by the primitive.

In one embodiment, the real sample locations 410 are located at the center of the pixels. Each pixel, such as pixel 443, has a number of virtual sample locations (e.g., virtual sample location 420), which are identified using circles (O). In the example of FIG. 4, the virtual sample locations are arranged throughout the interior of each pixel, as described previously herein. In one embodiment, there are 4 virtual sample locations per pixel.

For a pixel 441 that is partially covered by a new primitive 450, a virtual sample location (e.g., virtual sample locations 421 and 423) may be associated with the real sample location 411 of the local pixel 441 or with the real sample location of one of the proximate (adjacent) pixels. In the example of FIG. 4, in which there are 4 virtual sample locations per pixel, the adjacent pixel that is selected may be the closest pixel moving up, down or to the side (right or left) from the local pixel, as described previously herein. In an embodiment utilizing 8 virtual sample locations per pixel, the adjacent pixel that is selected may be the pixel above, below, right, left, or along one of the 4 diagonal directions of the local pixel.

Because a scene is typically rendered as a sequence of primitives, FIG. 4 represents changes in a virtual coverage mask that occurs when one new primitive 450 is rasterized. Previously determined coverage results for real and virtual sample locations that are not covered by the new primitive 450 are unchanged.

In one embodiment, a virtual coverage mask is changed when a new primitive is rasterized, as follows. For pixels that have real sample locations covered by the new primitive 450 (e.g., real sample locations 411, 412 and 413 of pixels 441, 444 and 446), any virtual sample locations covered by the new primitive 450 are marked as covered (covered virtual sample locations are identified in FIG. 4 as solid circles and uncovered virtual sample locations are identified in FIG. 4 as open circles), while virtual sample locations within those pixels that are not covered by new primitive 450 are not marked as covered (e.g., virtual sample locations 423, 424, 425 and 426 in pixels 441 and 446 are not marked as covered). For pixels in which new primitive 450 does not cover any real sample locations but only covers a virtual sample (e.g., virtual sample locations 422, 427, 428 and 429 in pixels 442, 445 and 447), virtual sample locations within those pixels are marked as not covered.

In one embodiment, the virtual sample coverage information is encoded as a single additional bit that is a pointer indicating ownership by one of two possible pixels, either the local pixel within which the virtual sample location resides or an adjacent pixel. In one embodiment, a binary "1" is used to indicate that a virtual sample belongs to a real sample in the local pixel, and a binary "0" is used to indicate that a virtual sample belongs to a real sample in a neighboring pixel. Because there are only two possible owners per virtual sample location, it is not necessary to point to a specific pixel or real sample location; the value of the pointer bit (either 0 or 1) is sufficient for identifying which pixel or real sample location owns the virtual sample location.

In one embodiment, the set of single-bit bitcodes for the virtual sample locations forms a virtual coverage mask. As a new primitive is received, the virtual coverage mask is updated to reflect any changes in ownership of the virtual sample locations. The virtual coverage mask may be stored in a portion of anti-aliasing buffer 255 (FIG. 2) or some other memory location.

The virtual samples provide additional information and may be used to adjust a weight given to real samples in anti-aliasing. In one embodiment, because a virtual sample is assumed to have the same color as the real sample that owns it, the number of sample counts for a particular color can be increased by the number of corresponding virtual sample counts and then scaled by the total number of real and virtual samples. Consider an example in which there are 4 virtual samples and one real sample per pixel, the color component of the real sample is black, two of the virtual samples are associated with the real sample (and thus have a black color component), and two of the virtual samples are associated with the real sample of an adjacent pixel that has a white color component. Consequently, the color of the local pixel would be three-fifths black and two-fifths white. However, more generally, an arbitrary weighting function may be used for weighting real samples as a function of the virtual samples that they own. In one embodiment, the weighting corresponds to a fraction of a number easily represented in binary (e.g., an integer multiple of $1/128$). In one such embodiment, the weight of the real sample is $20/128$ and the weight of each virtual sample is $27/128$.

Embodiments in accordance with the present invention provide a number of benefits. Each virtual sample, represented using a single bit, requires less data than a real sample. Consequently, high quality anti-aliasing can be achieved for a particular number of real and virtual samples with reduced data storage and bandwidth requirements. Additionally, embodiments in accordance with the present invention are highly scalable and order-independent, are compatible with a low-cost hardware implementation, do not suffer from bleed-through, and are compatible with different color and depth buffer formats.

Some graphics systems render a scene in a particular order relative to the foreground and the background. In back-tofront rendering, all objects are drawn, from the background to the foreground, even if the object will eventually be occluded. In contrast, in front-to-back rendering, the rendering process begins with objects likely to be in the foreground and moves towards objects likely to be in the background.

An advantage of front-to-back rendering order is that it allows early culling of occluded primitives at a stage when occluded primitives are not fully drawn. Invisible objects, for example, do not need to be fully drawn, reducing the computational effort. After some initial data is generated for an object likely to be invisible, an additional z-depth or stencil test is performed. For example, in the z-depth test of possibly occluded primitives, z-depth values of primitives are checked against a z-depth buffer to confirm that they are invisible (e.g., occluded by nearer objects that block them from view).

High quality anti-aliasing of silhouette edges in front-to-back rendering utilizes z-depth or stencil information for the sample points to check whether the sample points are occluded or visible. For a virtual sample location that belongs to a real sample location within the same pixel, the z-depth or stencil value for the virtual sample can be selected to be the same as that of the real sample. In one embodiment, the depth or stencil information for an uncovered virtual sample location is selected to be that of a neighboring pixel with which the virtual sample location has been associated, as described above. This approximation permits z-depth or stencil testing to be performed when new primitives are rasterized in front-to-back rendering. After z-depth or stencil testing is performed, the virtual coverage mask may be updated to reflect changes in virtual sample ownership resulting from the z-depth or stencil testing.

Figure 5:
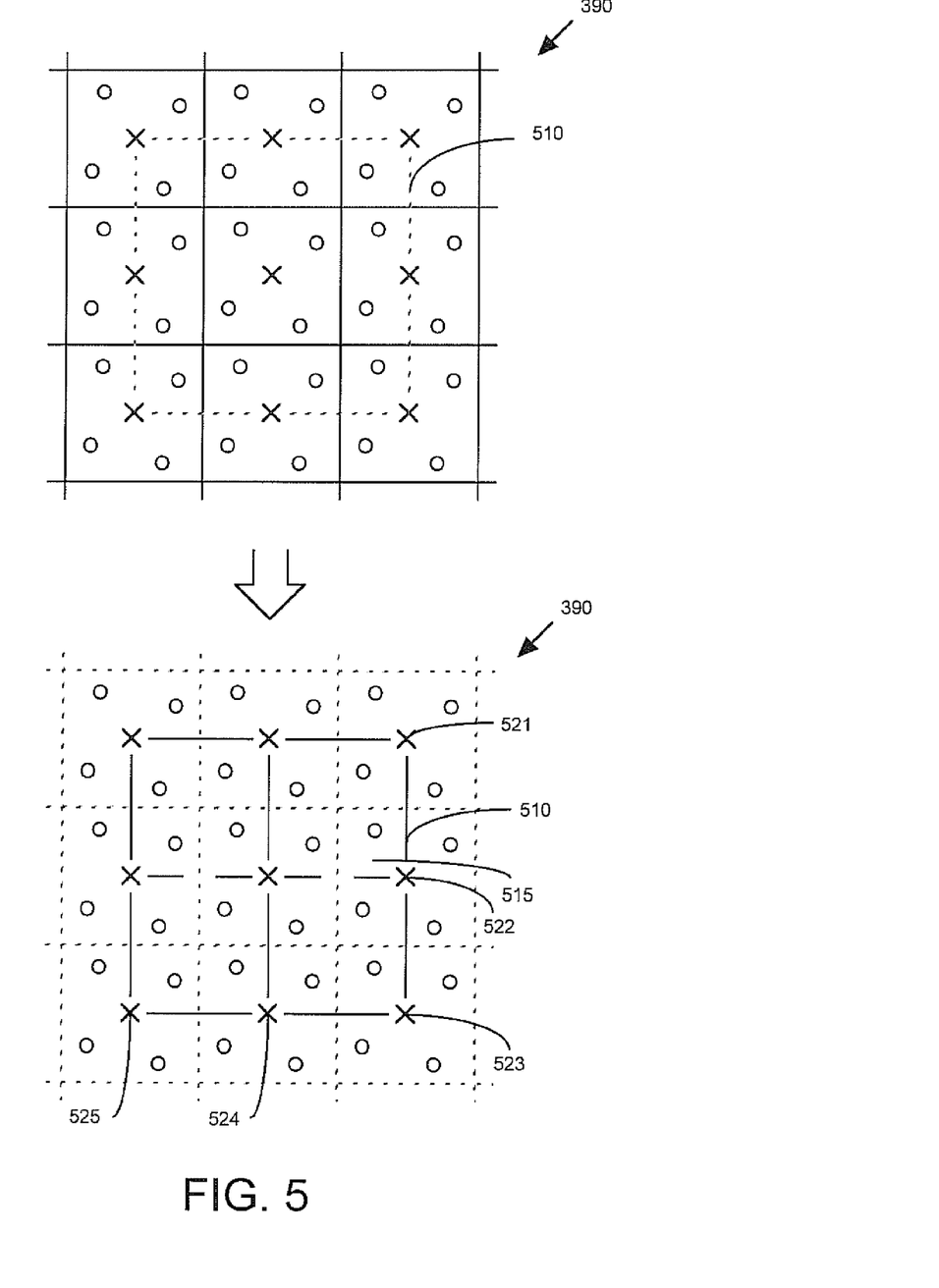
FIG. 5 illustrates a selected array of real sample locations in accordance with an embodiment of the present invention.

FIG. 5 illustrates an array 510 of real sample locations that are selected from an array 390 of pixels, in order to perform testing (e.g., z-depth test, but also stencil testing) according to an embodiment of the present invention. The array 390 of pixels has been previously described in conjunction with FIG. 3A, above. In FIG. 5, real sample locations are identified using a cross (X) and virtual sample locations are identified using a circle (O).

In overview, the array 510 of real sample locations can be selected to delineate and encompass a region 515 containing a number of virtual sample locations. All of the virtual sample locations in the region 515 are associated with one of the real sample locations in the selected array 510. In other words, none of the virtual sample locations in the region 515 is or will be associated with a real sample location that is not a member of the array 510; no virtual sample in the region 515 points to a real sample past the boundary defined by the array 510 of real samples. In one embodiment, rendering is essentially shifted so that a three-by-three (3×3) array of real samples, and an associated region containing 16 virtual samples, is rendered.

In the present embodiment, to perform testing (e.g., depth or stencil testing) for the 16 virtual sample locations in the region 515, nine (9) real sample values are used (one value per real sample in the array 510). In comparison, in a conventional approach, 12 real sample values are used to perform testing for 16 virtual samples in a quad of pixels (4 virtual samples per pixel). For example, in a conventional approach, z-depth values for the 4 pixels in the quad, as well as for the 2 pixels above the quad, the 2 pixels to the left of the quad, the 2 pixels to the right of the quad, and the 2 pixels below the quad, would be needed. According to the present embodiment, 16 virtual sample locations can be processed using only 9 z-depth values. Consequently, computer resources (e.g., the bandwidth associated with reads from the framebuffer) are conserved. Although described for z-depth values, the example is equally valid for stencil values.

In considering the coverage of any one virtual sample location, the conventional approach and the present invention approach would use the same real sample values to evaluate ownership of that virtual sample location, and thus the results of the conventional approach and the present invention approach are the same. However, an important difference between the conventional approach and the present invention approach is that the subset of 16 virtual samples processed at a time in accordance with embodiments of the present invention is different from the subset of 16 virtual samples processed at a time in the conventional approach.

Rendering generally proceeds through a scene from left to right and from top to bottom. Coverage of virtual sample locations outside of region 515 is evaluated before or after the evaluation of region 515, so that all virtual sample locations are processed. For example, if the array 510 and region 515 are processed in step 1, then in step 2 a similar (second) array and region, to the right of and adjacent to array 510 and region 515, would be processed. Processing of the second array/region will reuse the real samples 521, 522 and 523, and thus only six (6) new z-depth or stencil values would need to be fetched from the framebuffer 250 (FIG. 2). In a similar manner, when the next row is processed, processing of the array/region that is below and adjacent to array 510 and region 515 will reuse the real samples 523, 524 and 525, and so again only 6 new z-depth or stencil values would need to be fetched from the framebuffer 250. Again, computer resources (e.g., the bandwidth associated with reads from the framebuffer) are conserved.

In general, according to embodiments of the present invention, as rendering proceeds from left to right and from top to bottom, only depth or stencil values for pixels down and to the right of the current block of pixels being rendered are needed. Accordingly, so-called race situations, in which a z-depth or stencil value has been updated during processing of a previous quad but has not yet been written to the framebuffer (and so cannot be fetched from the framebuffer when needed), are avoided. In other words, in a conventional approach, to determine ownership of a virtual sample location in the conventional manner, a real sample above or to the left (opposite the order of rendering) may be needed, but that real sample, if updated during rendering, may not yet be available. According to embodiments of the present invention, this situation is avoided.

Figure 6:
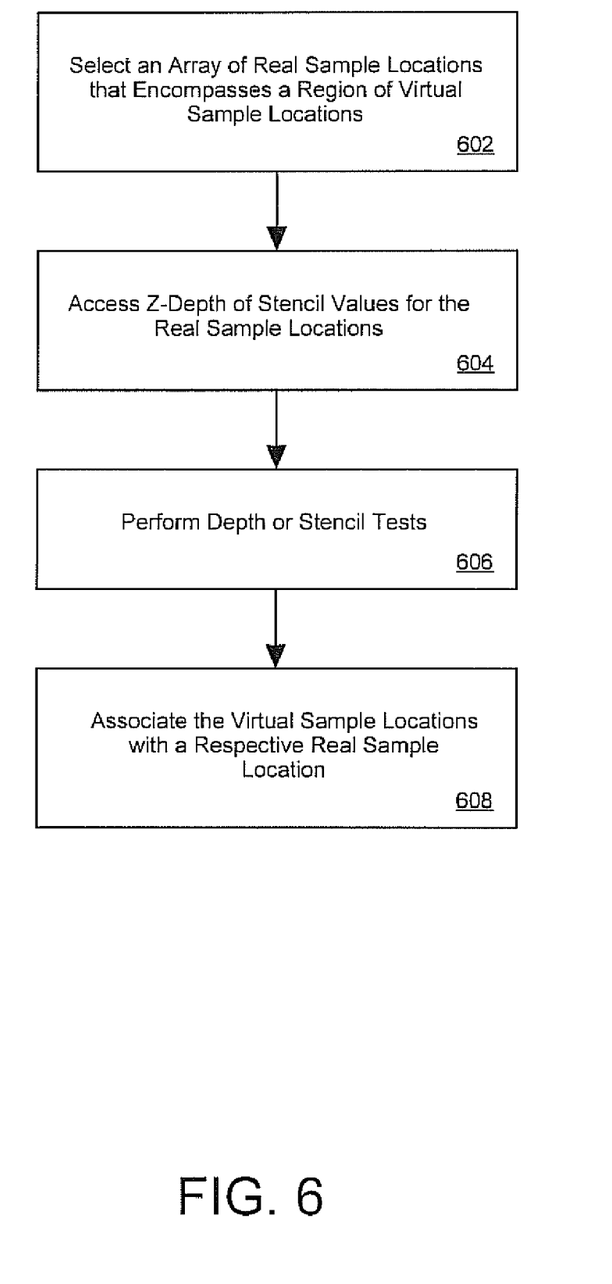
FIG. 6 is a flowchart of an exemplary computer-implemented method for processing pixel data according to an embodiment of the present invention.

FIG. 6 is a flowchart 600 of a computer-implemented method for processing pixel data according to an embodiment of the present invention. In one embodiment, flowchart 600 is performed by graphics system 130 (e.g., rasterizer 220) of FIG. 2.

In block 602 of FIG. 6, an array of real sample locations is selected (e.g., array 510 of FIG. 5). In one embodiment, the array includes N-by-N real (e.g., 3×3) real sample locations. However, embodiments in accordance with the present invention are not so limited. Different shapes (e.g., rectangular, polygon, honeycomb) may be used instead of a squarish array. The array may be covered at least in part by a primitive (see FIG. 4, for example). A number of virtual sample locations are disposed within the region delineated by the array of real sample locations (e.g., region 515 of FIG. 5). In one embodiment, the array of real sample locations includes less than all real sample locations associated with a frame of pixel data.

In block 604 of FIG. 6, in one embodiment, a set of z-depth or stencil values for the array of real sample locations is accessed, one z-depth or stencil value for each real sample location. In one such embodiment, in which the array includes 9 real sample locations, up to 9 z-depth or stencil values may be accessed (as values are reused, perhaps less z-depth values may be needed).

In block 606 of FIG. 6, tests (e.g., a depth test or stencil test) are performed using the first set of z-depth or stencil values, as described above in conjunction with FIG. 3B.

In block 608 of FIG. 6, with reference also to FIG. 5, the results of the tests are used to associate each virtual sample location within the region 515 with one of two possible real sample locations selected from the array 510 of real sample locations.

The process of flowchart 600 can be repeated as new primitives are introduced into and pass through the graphics pipeline.

Figure 7:
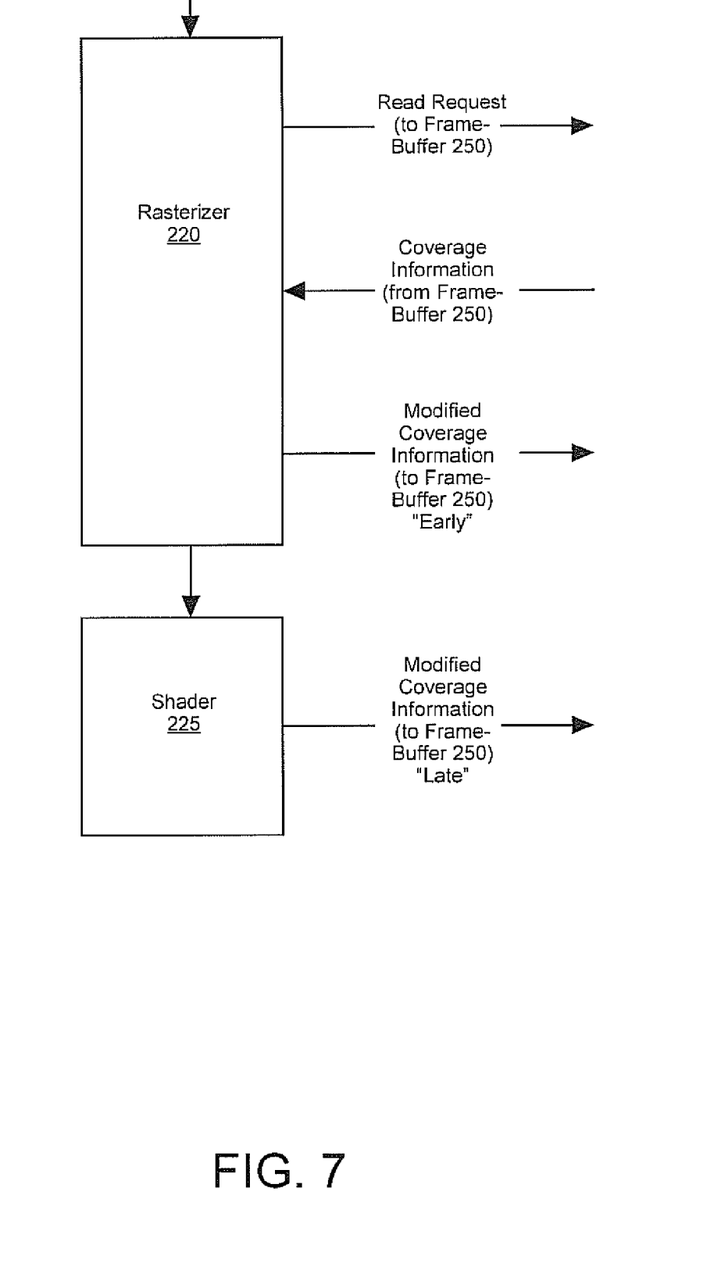
FIG. 7 is a block diagram of a rasterizer and shader according to an embodiment of the present invention.

FIG. 7 is a block diagram of a rasterizer 220 which contains a virtual sample module 260 (FIG. 2) and coverage update module 240 (FIG. 2), and a shader 225 according to another embodiment of the present invention. In the example of FIG. 7, the rasterizer 220 requests virtual coverage information from the framebuffer 250 (FIG. 2) for a block of pixels. The coverage information (a portion of the virtual coverage mask) received in response to the request may be modified by the rasterizer 220 as described previously herein. If the rasterized virtual coverage information cannot be changed by the shader 225, then the rasterizer 220 can write the coverage information to the framebuffer 250; this may referred to as "early CSAA." If, however, the coverage information can be changed by the shader 225, then the rasterizer 220 sends the coverage information to the shader; this may be referred to as "late CSAA."

For example, if the software driver determines that the shader 225 is using alpha (transparency) to kill a pixel (thus modifying the coverage information), then the driver can direct the rasterizer 220 to send the coverage information to the shader.

In one embodiment, a scoreboard (not shown) is used to keep track of which pixels are being worked on at any point in a graphics pipeline that includes the rasterizer 220 and shader 225. If the rasterizer 220 can write coverage information to the framebuffer 250 (that is, if the shader 225 will not be modifying the coverage information), then the rasterizer can also clear the appropriate entry in the scoreboard. Otherwise, the shader 225 clears the appropriate entry in the scoreboard at the appropriate time.

Because, in some embodiments, the rasterizer 220 processes up to 4 times more data (pixels) than the shader, the scoreboard can be updated more frequently if the rasterizer can write coverage information to the framebuffer 250. Also, because the rasterizer 220 generally precedes the shader 225 in a graphics pipeline, the coverage information reaches the framebuffer 250 sooner when written by the rasterizer, and is thus on hand earlier if needed for other pipeline operations.

Figure 8:
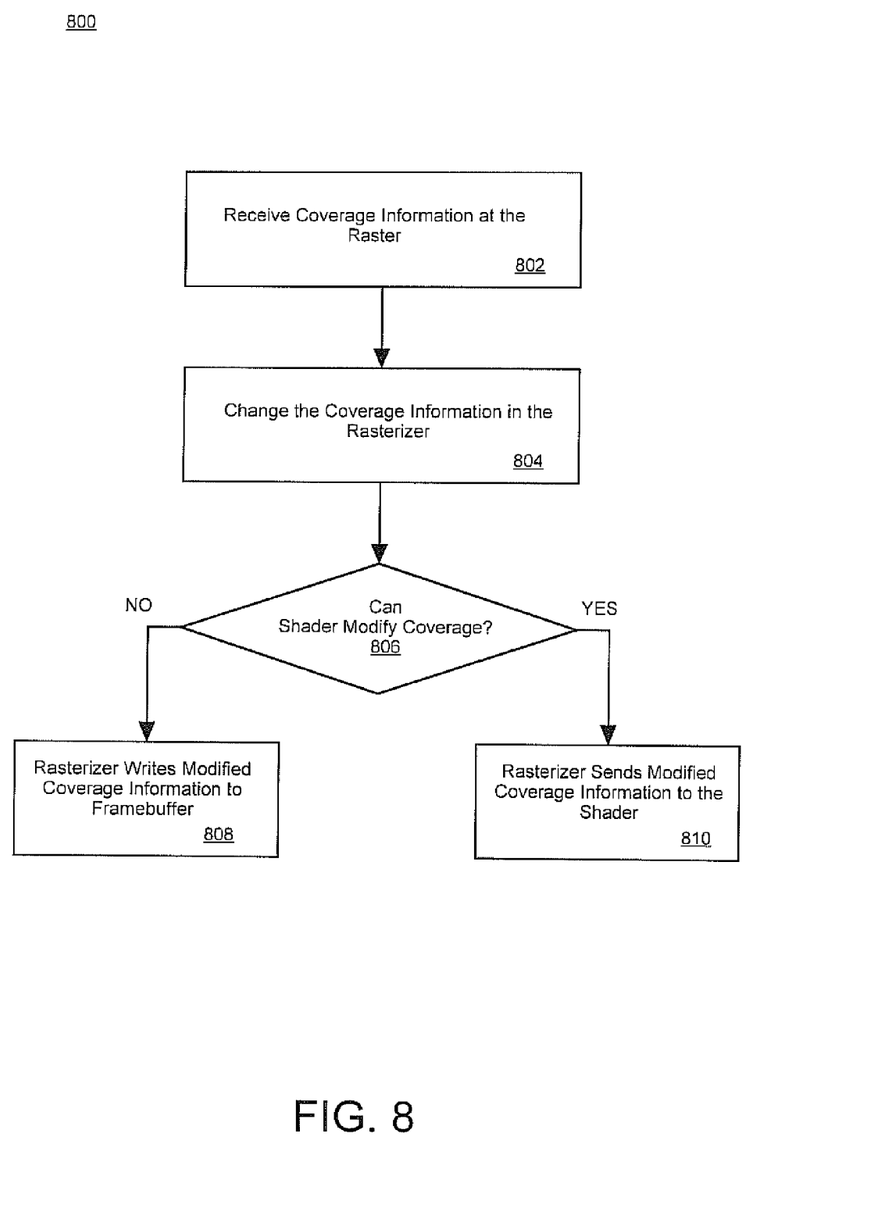
FIG. 8 is a flowchart of an exemplary computer-implemented method for processing pixel data according to another embodiment of the present invention.

FIG. 8 is a flowchart 800 of a computer-implemented method for processing pixel data according to another embodiment of the present invention. In block 802, with reference also to FIG. 7, a rasterizer 220 receives virtual coverage information for a pixel or block of pixels. Associated with each pixel are a real sample location and a number of virtual sample locations, as previously described herein.

In block 804, the rasterizer 220 changes the coverage information (e.g., the virtual coverage mask) to account for a new primitive that covers the pixel(s) at least in part, producing modified coverage information, as previously described herein.

In block 806, a determination is made as to whether or not the shader 225 can modify the coverage information (early CSAA versus late CSAA). If the shader cannot modify the coverage information (early CSAA), then flowchart 800 proceeds to block 808; otherwise, flowchart 800 proceeds to block 810 (late CSAA).

In block 808 (early CSAA) of FIG. 8 and with reference also to FIG. 7, the rasterizer 220 writes the modified coverage information to the framebuffer 250 provided the shader 225 will not be causing a change to the modified coverage information.

In block 810 (late CSAA), if the shader 225 can change the coverage information, the coverage information is sent from the rasterizer 220 to the shader.

There are instances in which the shader 225 can write virtual coverage information (for virtual samples) to the framebuffer 250 but should not write information (e.g., updated z-depth values or updated stencil values) for real samples to the framebuffer. One such instance occurs when a primitive covers only virtual sample locations; that is, the primitive does not cover any real sample locations. This situation may be referred to as "virtual-only" coverage. With virtual-only coverage, the shader 225 is instructed (e.g., by a software driver via a shader program) to update only the virtual coverage information (for virtual sample locations), but not to update information for real sample locations. In the context of the embodiment discussed above, this situation can occur only during late CSAA, because in early CSAA, coverage information for pixels that have virtual-only coverage is not sent to the shader 225.

There are other instances in which the shader 225 can write information such as color, depth and/or stencil values to the framebuffer 250 even with virtual-only coverage. As mentioned above, pixels that have real sample locations that are covered can be distinguished from pixels with virtual-only coverage in that color, depth and/or stencil information for pixels with covered real sample locations can be potentially written to the framebuffer 250, while color, depth and stencil information for pixels with virtual-only coverage is not written to the framebuffer. However, in some operating modes, it is desirable for pixels with virtual-only coverage to trigger an update of the color, depth and/or stencil information. One such operating mode is referred to as "coverage-to-alpha," in which the percentage of coverage of a pixel by a primitive is used to determine the degree of transparency associated with the pixel.

Accordingly, in one embodiment, even a pixel with virtual-only coverage can trigger the shader 225 to update color, depth and/or stencil information in the framebuffer 250. This can be accomplished in different ways. In one embodiment, this is accomplished by changing the coverage bit associated with the pixel's real sample location from 0 to 1, thereby indicating to the shader 225 that the real sample location is covered even though it is not. A coverage bit associated with one of the virtual sample locations may correspondingly be changed from 1 to 0 such that the overall coverage (e.g., the total number of covered samples for the pixel) is unchanged.

Thus, according to the embodiments just described, if no real sample locations are covered by a primitive, but the shader 225 may modify the coverage information (e.g., as in late CSAA), then the shader 225 will not update color, depth and/or stencil information unless instructed to the contrary by the shader program, in operating modes such as coverage-to-alpha, for example.

Figure 9:
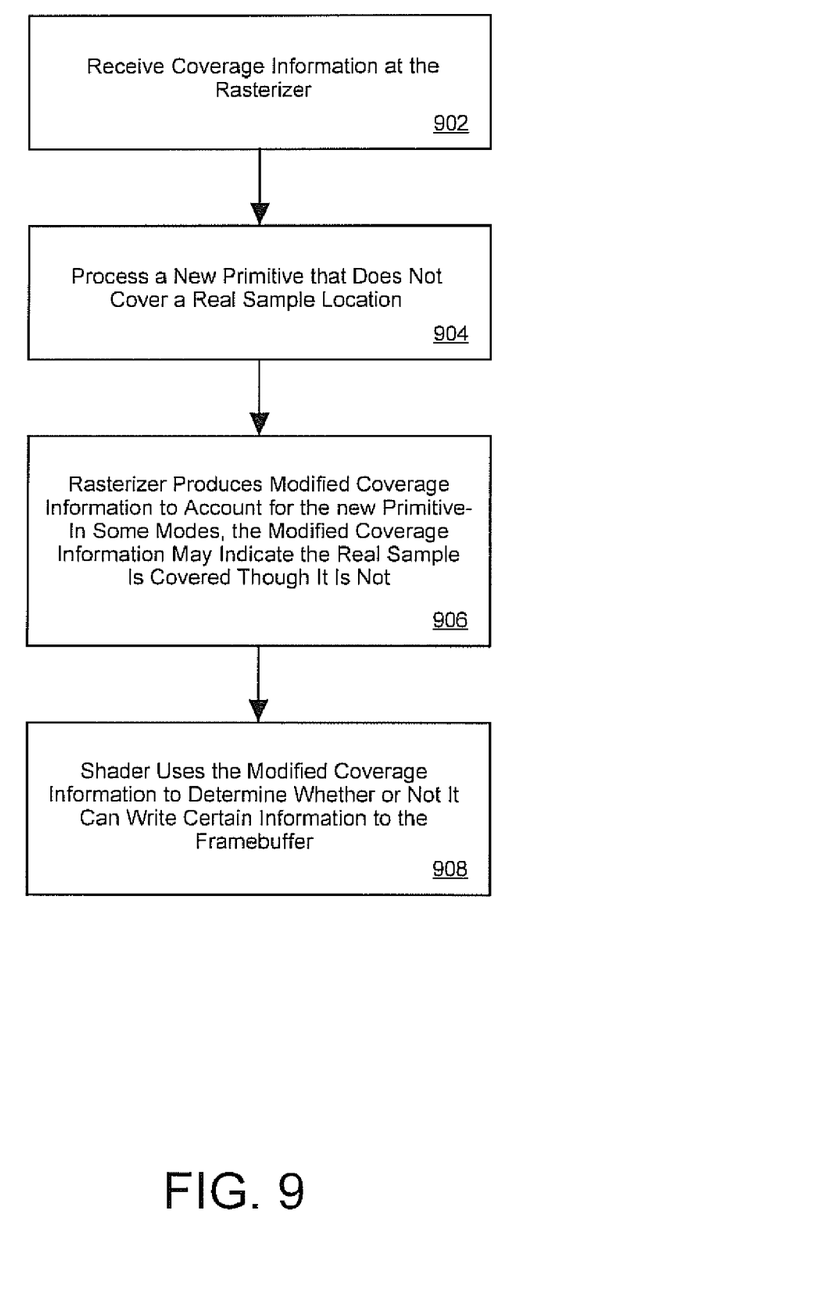
FIG. 9 is a flowchart of an exemplary computer-implemented method for processing pixel data according to yet another embodiment of the present invention.

FIG. 9 is a flowchart 900 of a computer-implemented method for processing pixel data according to another embodiment of the present invention. In block 902, with reference also to FIG. 7, the rasterizer 220 receives coverage information for a pixel or block of pixels. Associated with each pixel are a real sample location and a number of virtual sample locations, as previously described herein.

In block 904, the rasterizer 220 receives a new primitive that covers only one or more of the virtual sample locations in the pixel(s) and does not cover any real sample locations.

In block 906, the rasterizer 220 produces modified coverage information by changing the virtual coverage information to account for the new primitive, as previously described herein. In one embodiment, a determination is made as to whether or not the shader 225 can modify the coverage information (early CSAA versus late CSAA), as described above in conjunction with FIG. 8. In such an embodiment, in the case of early CSAA, the rasterizer 220 writes the modified coverage information to the framebuffer 250, while in the case of late CSAA, the modified coverage information is sent to the shader 225.

In one embodiment, in some operating modes such as coverage-to-alpha, the coverage information is modified further to indicate that the real sample location is covered even though it is not covered.

In block 908 of FIG. 9 and with reference also to FIG. 7, the shader 225 writes the modified coverage information to the framebuffer 250. The shader 225 also uses the modified coverage information to determine whether the shader can write color information, stencil information and/or depth information to the framebuffer 250. In one embodiment, referred to above as virtual-only coverage, the shader 225 can update virtual coverage information but does not update color, stencil and/or depth information.

In another embodiment, in some operating modes such as coverage-to-alpha, the shader 225 can update real sample information such as color, stencil and/or depth information even with virtual-only coverage. Because the coverage information may be modified as described above to indicate that a real sample is covered even though it is not, the shader 225 can still use the coverage information to make this decision. In other words, from the perspective of shader 225, the coverage information is believed to be correct, and so the shader will act accordingly.

Although specific steps are disclosed in flowcharts 600, 800 and 900 of FIGS. 6, 8 and 9, such steps are exemplary. That is, the present invention is well-suited to performing various other steps or variations of the steps recited in flowcharts 600, 800 and 900. The steps in flowcharts 600, 800 and 900 may be performed in an order different than presented and that the steps in flowcharts 600, 800 and 900 are not necessarily performed in the sequence illustrated. Furthermore, the features of the various embodiments described above can be used alone or in combination.

Embodiments of the present invention are thus described. While the present invention has been described in particular embodiments, it should be appreciated that the present invention should not be construed as limited by such embodiments, but rather construed according to the below claims.

What is claimed is:

1. A non-transitory computer-readable medium having stored therein instructions that when executed by a computer system perform a method of processing pixels, said method comprising:
    selecting a first array of real sample locations within a plurality of pixels covered at least in part by a primitive, wherein each of said real sample locations is associated with a single pixel and wherein each pixel of said plurality of pixels includes a single one of said real sample locations;
    accessing a first set of pixel attribute values for said first array of real sample locations;
    performing tests using said first set of pixel attribute values; and
    using results of said tests to determine whether to associate a virtual sample location that is covered by said primitive and within a first pixel in said plurality of pixels with a first real sample location that is in said first array and within said first pixel, wherein said virtual sample location assumes a pixel attribute value that is associated with said first real sample location if said first real sample location is covered by said primitive, and wherein if said first real sample location is not covered by said primitive then said virtual sample location assumes a pixel attribute value of a second real sample location that is in said first array and within a second pixel that adjoins said first pixel.

2. The non-transitory computer-readable medium of claim 1 wherein said method further comprises:
    determining that a second primitive covers said first real sample location; and
    determining whether said virtual sample location is to remain associated with said first real sample location by comparing a pixel attribute value associated with said second primitive and a pixel attribute value associated with a second real sample location in said first array.

3. The non-transitory computer-readable medium of claim 1 wherein said tests are selected from the group consisting of: depth tests and stencil tests; and wherein said pixel attribute value is selected from the group consisting of: z-depth value and stencil value.

4. The non-transitory computer-readable medium of claim 1 wherein said method further comprises:
    identifying a second array of real sample locations adjacent to said first array;
    accessing a second set of pixel attribute values for said second array of real sample locations, said second set of pixel attribute values comprising a subset of said first set of pixel attribute values; and
    performing tests using said second set of pixel attribute values to associate a virtual sample location within said second region with a real sample location in said second array.

5. The non-transitory computer-readable medium of claim 1 wherein a plurality of virtual sample locations are disposed within a region delineated by said first array of real sample locations, wherein said method further comprises associating each virtual sample location in said first plurality of virtual sample locations with a single real sample location in said first array.

6. A computer system comprising:
    a central processing unit;
    a memory unit coupled to said central processing unit; and
    a graphics system coupled to said memory, wherein said graphics system is operable for identifying a first array of real sample locations within a plurality of pixels covered at least in part by a primitive, wherein each of said real sample locations is associated with a single pixel and wherein each pixel of said plurality of pixels includes a single one of said real sample locations, wherein further said graphics system is operable for performing tests using a first set of pixel attribute values for said first array of real sample locations and for using results of said tests to determine whether to associate a virtual sample location that is covered by said primitive and within a first pixel in said plurality of pixels with a first real sample location that is in said first array and within said first pixel, wherein said virtual sample location assumes a pixel attribute value that is associated with said first real sample location if said first real sample location is covered by said primitive, and wherein if said first real sample location is not covered by said primitive then said virtual sample location assumes a pixel attribute value of a second real sample location that is in said first array and within a second pixel that adjoins said first pixel.

7. The computer system of claim 6 wherein said graphics system is further operable for determining that a second primitive covers said first real sample location and for determining whether said virtual sample location is to remain associated with said first real sample location by comparing a pixel attribute value associated with said second primitive and a pixel attribute value associated with a second real sample location in said first array.

8. The computer system of claim 6 wherein said graphics system is further operable for identifying a second array of real sample locations adjacent to said first array, and wherein further said graphics system is operable for performing tests using a second set of pixel attribute values for said second array of real sample locations to associate a virtual sample location within said second region with a real sample location in said second array.

9. The computer system of claim 6 wherein a plurality of virtual sample locations are disposed within a region delineated by said first array of real sample locations, wherein said graphics system is further operable for associating each virtual sample in said first plurality of virtual samples with a single real sample in said first array.

10. A non-transitory computer-readable medium having stored therein instructions that when executed by a computer system perform a method of processing a block of pixels covered at least in part by a first primitive, said method comprising:

accessing pixel attribute values for a three-by-three (3×3) array of real sample locations associated with said block of pixels, wherein each pixel in said block of pixels is associated with a single real sample location;

performing a test using said pixel attribute values; and using a result of said test to determine whether to associate a virtual sample location that is covered by said first primitive and within a first pixel in said block of pixels with a real sample location that is selected from said array of real sample locations and within said first pixel, wherein said virtual sample location assumes a pixel attribute value that is associated with said real sample location if said real sample location is covered by said first primitive, and wherein if said real sample location is not covered by said first primitive then said virtual sample location assumes a pixel attribute value of a different real sample location that is in said 3×3 array and within a second pixel that adjoins said first pixel.

11. The non-transitory computer-readable medium of claim 10 wherein said method further comprises:

determining that a second primitive covers some portion of at least one pixel of said neighboring pixels; and determining whether said virtual sample location is to remain associated with said real sample location, wherein said decision depends on whether said real sample location is covered by said second primitive and on whether said virtual sample location is covered by said second primitive.

12. The non-transitory computer-readable medium of claim 10 wherein said test is selected from the group consisting of: a depth test and a stencil test; and wherein said pixel attribute value is selected from the group consisting of: z-depth value and stencil value.

13. The non-transitory computer-readable medium of claim 10 wherein said method further comprises caching at least some of said pixel attribute values for use in processing another plurality of neighboring pixels.

14. The computer-usable medium of claim 10 wherein a plurality of virtual sample locations are disposed within a region bounded by said 3×3 array of real sample locations, wherein said method further comprises associating each virtual sample location in said plurality of virtual sample locations with a single real sample location in said plurality of real sample locations.

\* \* \* \* \*